(12) United States Patent
Komiya

(10) Patent No.: US 7,719,250 B2
(45) Date of Patent: May 18, 2010

(54) HALF BRIDGE SWITCHING REGULATOR AND ELECTRONIC DEVICE

(75) Inventor: Motoki Komiya, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 509 days.

(21) Appl. No.: 11/819,680

(22) Filed: Jun. 28, 2007

(65) Prior Publication Data

US 2008/0012545 A1    Jan. 17, 2008

(30) Foreign Application Priority Data

Jun. 29, 2006    (JP)   ............... 2006-178900

(51) Int. Cl.
*G05F 1/40*    (2006.01)
(52) U.S. Cl. .................................... 323/285
(58) Field of Classification Search ............... 323/222, 323/265, 268, 282, 283, 285, 349, 351
See application file for complete search history.

(56) References Cited

U.S. PATENT DOCUMENTS

| | | | | |
|---|---|---|---|---|
| 6,614,208 B2* | 9/2003 | Narita | ...................... | 323/283 |
| 7,433,216 B2* | 10/2008 | Romenesko | ............... | 363/132 |
| 7,436,126 B2* | 10/2008 | Yang | ........................ | 315/224 |
| 7,646,181 B2* | 1/2010 | Cheon et al. | ............... | 323/268 |
| 2004/0095789 A1* | 5/2004 | Li et al. | .................... | 363/132 |
| 2005/0184714 A1* | 8/2005 | Rusu et al. | ................. | 323/282 |

FOREIGN PATENT DOCUMENTS

| | | |
|---|---|---|
| JP | A 7-046853 | 2/1995 |
| JP | A 2006-340421 | 12/2006 |

* cited by examiner

*Primary Examiner*—Adolf Berhane
(74) *Attorney, Agent, or Firm*—Oliff & Berridge PLC

(57) ABSTRACT

A half bridge step-up switching regulator is configured including an output voltage adjusting switch element Q1 for adjusting an output voltage; a synchronous switch element Q2, connected in series with the output voltage adjusting switch element Q1, that is complementary ON operated when the output voltage adjusting switch element Q1 is turned OFF; a voltage detecting section 10 for detecting the voltage at a connecting node of the switch elements in time of turn-OFF of the synchronous switch element; and a soft switch control section 20 for adjusting the timing of turn-OFF of the synchronous switch element Q2 based on the voltage fluctuation detected by the voltage detecting section 10 to perform zero current switching control.

17 Claims, 16 Drawing Sheets

Fig.10

| COUNT VALUE | 1 | 2 | 3 |
|---|---|---|---|
| REDUCING CORRECTION AMOUNT | −200(ns) | −100(ns) | −50(ns) |

HALF BRIDGE SWITCHING REGULATOR AND ELECTRONIC DEVICE

BACKGROUND OF THE INVENTION

1. Field of the Invention

The present invention relates to a half bridge switching regulator configured by an output voltage adjusting switch element for adjusting an output voltage, and a synchronous switch element, connected in series with the output voltage adjusting switch element, that is complementary ON operated when the output voltage adjusting switch element is turned OFF.

2. Description of the Related Art

In this type of switching regulator, a soft switching method is adopted in which the output voltage adjusting switch element for adjusting the output voltage and the synchronous switch element that is complementary ON operated when the output voltage adjusting switch element is turned OFF are connected in series between input voltage terminals (in step-down regulator) or between output voltage terminals (in step-up regulator), and the synchronous switch element and the output voltage adjusting switch element are complementary ON/OFF operated by a switch control section to reduce switching loss and noise.

Japanese Laid-Open Patent Publication No. 07-46853 proposes a controlling method of performing, in a half bridge inverter configured by two switching elements, zero voltage switching and zero current voltage switching by providing a dead time with respect to the switching elements when switching each switching element ON/OFF as a soft switching inverter controlling method for reducing switching noise and switching loss and for controlling the output voltage by a constant switching frequency.

As shown in FIG. 1A, for instance, in a step-up switching regulator configured by an output voltage adjusting switch element Q1 for adjusting the output voltage and a synchronous switch element Q2 connected in series with the output voltage adjusting switch element Q1, the OFF timing of the synchronous switch element Q2 is determined by a map calculated value set, which is set in advance based on an input/output voltage values, to appropriately adjust the dead time.

This will be described in detail below. The step-up switching regulator is configured by the output voltage adjusting switch element Q1 for adjusting an output voltage Vout at an output voltage terminal OUT; a synchronous switch element Q2, connected in series with the output voltage adjusting switch element Q1, that is complementary ON operated when the output voltage adjusting switch element Q1 is turned OFF; a resonance circuit including a step-up coil L1 and a capacitor C1 that LC resonate in an aim of reducing the voltage Vds between the switch elements, which will be described later; and a bypass capacitor C2 for stabilizing the output voltage.

The output voltage adjusting switch element Q1 and the synchronous switch element Q2 are configured by n-channel MOS-FET, and a switch control section for switching each switch element ON/OFF by controlling the respective gate voltages of the output voltage adjusting switch element Q1 and the synchronous switch element Q2 is arranged.

The switch control section controls the switching regulator according to a timing chart shown in FIG. 1B. The switch control section determines a timing (TA1) to switch the output voltage adjusting switch element Q1 from ON to OFF based on the output voltage Vout. When the output voltage adjusting switch element Q1 is turned OFF, the voltage Vds between the switch elements rises, and the synchronous switch element Q2 is switched from OFF to ON at a timing (TA2) the voltage Vds between the switch elements and the output voltage Vout become equal.

The switch control section calculates the timing at which coil current IL, flowing through the step-up coil L1, that is reduced by turning ON the synchronous switch element Q2 becomes zero through map calculation, to be hereinafter described, and switches the synchronous switch element Q2 from ON to OFF at a timing (TA3) the calculated coil current IL becomes zero.

The output voltage adjusting switch element Q1 is switched from OFF to ON at a timing (TA4) the voltage Vds between the switch elements becomes zero. The switch control section controls the output voltage to be constant by repeating the basic operation described above.

In the basic operation described above, the timing of switching the synchronous switch element Q2 from ON to OFF, that is, the ON time t2 of the synchronous switch element in FIG. 1B can be obtained by [Eq. 1].

The maximum current Imax flowing through the step-up coil L1 in [Eq. 1] is obtained by [Eq. 2] based on the input voltage Vin at an input voltage terminal IN and time t0 defined by the OFF timing of the output voltage adjusting switch element Q1.

Therefore, the ON time t2 of the synchronous switch element is defined by the input voltage Vin and the output voltage Vout based on [Eq. 3] derived from [Eq. 1] and [Eq. 2].

$$t_2 = \frac{L \cdot I_{max}}{V_{out} - V_{in}} \quad \text{[Eq. 1]}$$

$$I_{max} = \frac{V_{in} \cdot t_0}{L} \quad \text{[Eq. 2]}$$

$$t_2 = \frac{V_{in} \cdot t_0}{V_{out} - V_{in}} \quad \text{[Eq. 3]}$$

The switch control section includes map data of the output voltage Vout with respect to various input voltages Vin created in advance, and the ON time t2 of the synchronous switch element is calculated based on the map calculation of applying the input voltage Vin and the output voltage Vout obtained from the map data to [Eq. 3].

A complicating circuit must be built to detect the input/output voltage or perform the map calculation when controlling the OFF timing of the synchronous switch element based on the result of the map calculation, but a feedback control is not used, and thus the OFF timing of the synchronous switch element cannot be controlled at satisfactory accuracy.

Furthermore, the map data must be set so that the synchronous switch element is turned OFF before the current backflows from the output side to the power supply side to ensure safety of the circuit, and thus the switching noise and the switch loss cannot be sufficiently reduced.

SUMMARY OF THE INVENTION

In view of the above problems, the present invention aims to provide a half bridge switching regulator capable of appropriately controlling the OFF timing of the synchronous switch element with a simple circuit and effectively reducing the switching noise and the switching loss.

In order to achieve the above object, a half bridge switching regulator including an output voltage adjusting switch element for adjusting an output voltage; a synchronous switch element, connected in series with the output voltage adjusting switch element, that is complementary ON operated when the output voltage adjusting switch element is turned OFF; a voltage detecting section for detecting the voltage at a connecting node of the switch elements in time of turn-OFF of the synchronous switch element; and a soft switch control section for adjusting the timing of turn-OFF of the synchronous switch element based on the voltage fluctuation detected by the voltage detecting section is proposed in the present invention.

According to the above configuration, the switching noise and the switching loss are effectively reduced since the OFF timing of the synchronous switch element is feedback controlled at an appropriate timing by the soft switch control section based on the voltage at the connecting node of the switch elements detected by the voltage detecting section.

Furthermore, the half bridge switching regulator does not need to arrange a large-volume memory for storing a great number of input voltage values and output voltage values, which were necessary in the prior art, as map data, and a complex circuit for calculating the OFF timing of the synchronous switch element, and merely needs to arrange a circuit for detecting the voltage at the connecting node of the switch elements, and thus is realized extremely easily and inexpensively.

BRIEF DESCRIPTION OF THE DRAWINGS

FIG. 10 is an explanatory view of correction amount map data;

DESCRIPTION OF THE PREFERRED EMBODIMENTS

The half bridge switching regulator according to the present invention will now be described.

Figure 2:
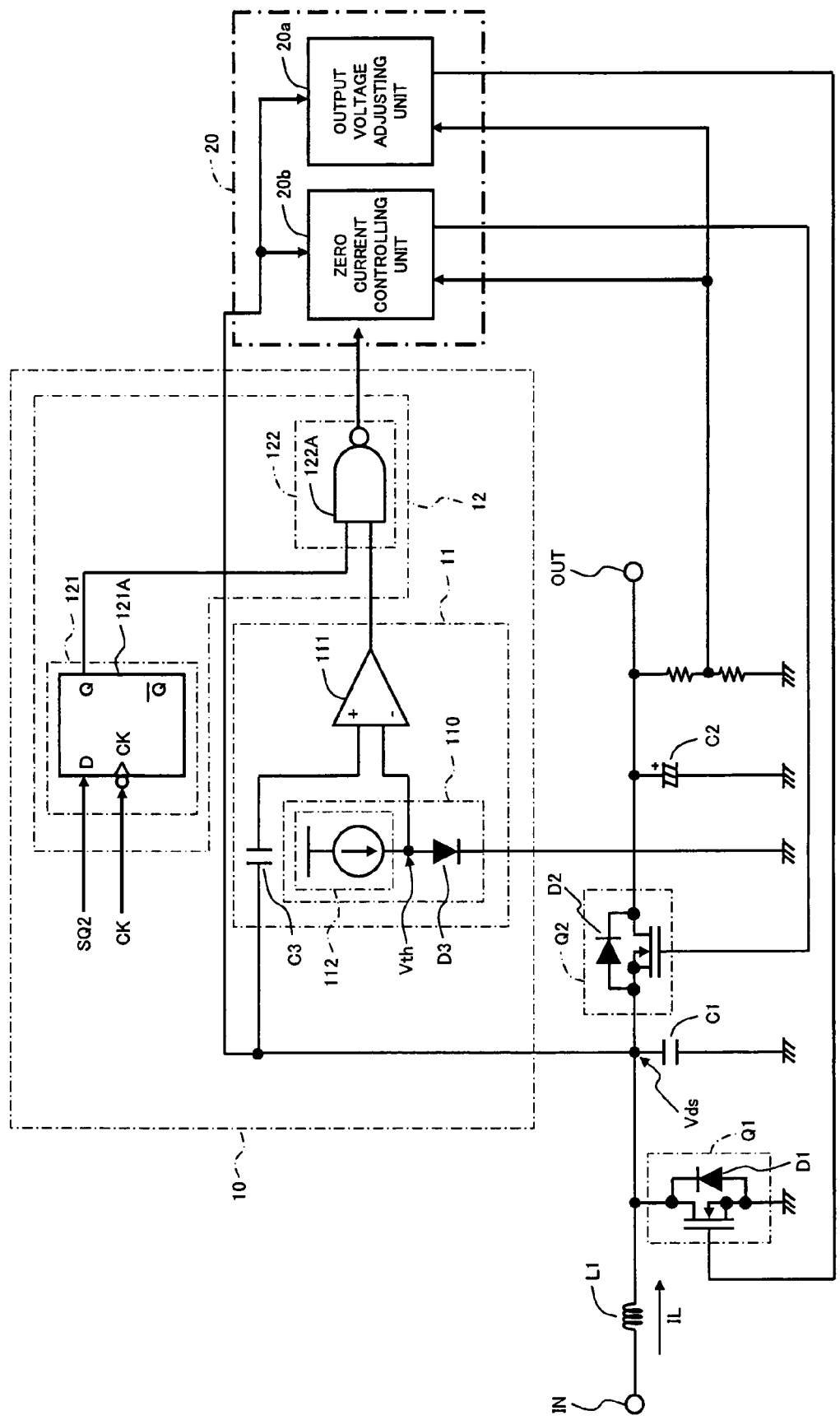
FIG. 2 is a circuit diagram of a step-up half bridge switching regulator including a voltage detecting section for detecting whether or not a timing for turning OFF the synchronous switch element is earlier than zero current switching.

As shown in FIG. 2, the step-up half bridge switching regulator is configured by an output voltage adjusting switch element Q1 for adjusting an output voltage Vout at an output voltage terminal OUT; a synchronous switch element Q2, connected in series with the output voltage adjusting switch element Q1, that is complementary ON operated when the output voltage adjusting switch element Q1 is turned OFF; a step-up coil L1 and a capacitor C1 for LC resonating in an aim of adjusting the voltage at a connecting node of the switching elements Q1, Q2, that is, the voltage Vds between the switch elements; a smoothing capacitor C2 for stabilizing the output voltage; a voltage detecting section 10 for detecting the voltage Vds between the switch elements in time of turn-OFF of the synchronous switch element Q2; and a soft switch control section 20 for adjusting the timing to turn OFF the synchronous switch element Q2 based on the voltage fluctuation detected by the voltage detecting section 10.

The output voltage adjusting switch element Q1 and the synchronous switch element Q2 are configured by n-channel MOS-FET.

The drain terminal of the output voltage adjusting switch element Q1 is connected to an input voltage terminal IN with the step-up coil L1 in between, and the source terminal is grounded.

The drain terminal of the synchronous switch element Q2 is connected to the output voltage terminal OUT, and the source terminal is connected to the input voltage terminal IN with the step-up coil L1 in between.

The respective gate terminals of the output voltage adjusting switch element Q1 and the synchronous switch element Q2 are connected to the soft switch control section 20, and the soft switch control section 20 controls the respective gate terminal voltages to switch ON/OFF of each switch element Q1, Q2.

Parasitic diodes D1, D2 respectively formed between the drain and the source of the output voltage adjusting switch element Q1 and the synchronous switch element Q2 configured by the MOS-FET serve as flywheel diodes.

The step-up coil L1 and the capacitor C1 are connected in series between the input voltage terminal IN and the ground, and configure an LC resonating circuit. That is, one end of the step-up coil L1 is connected to the input voltage terminal IN, the other end of the step-up coil L1 is connected to one end of the capacitor C1, and the other end of the capacitor C1 is grounded.

The smoothing capacitor C2 is connected between the output voltage terminal OUT and the ground at the post-stage of the synchronous switch element Q2.

Figure 1A:
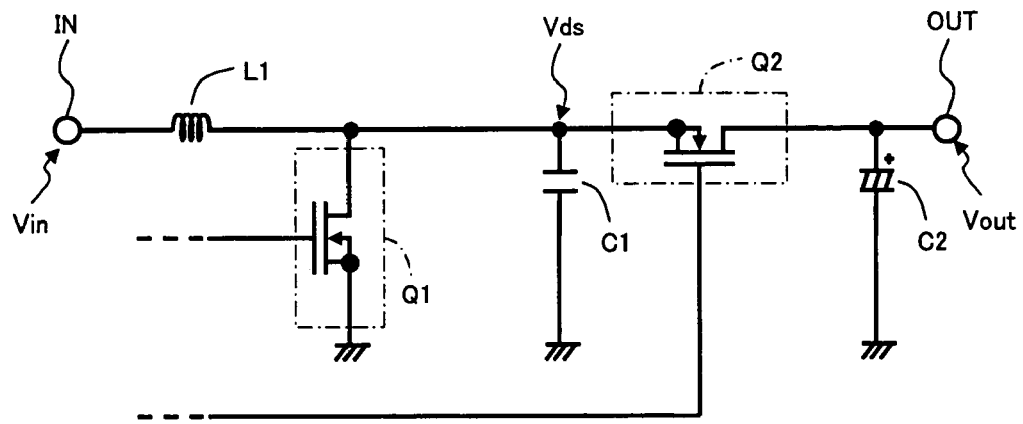
FIG. 1A is a circuit diagram showing a conventional step-up switching regulator.
Figure 1B:
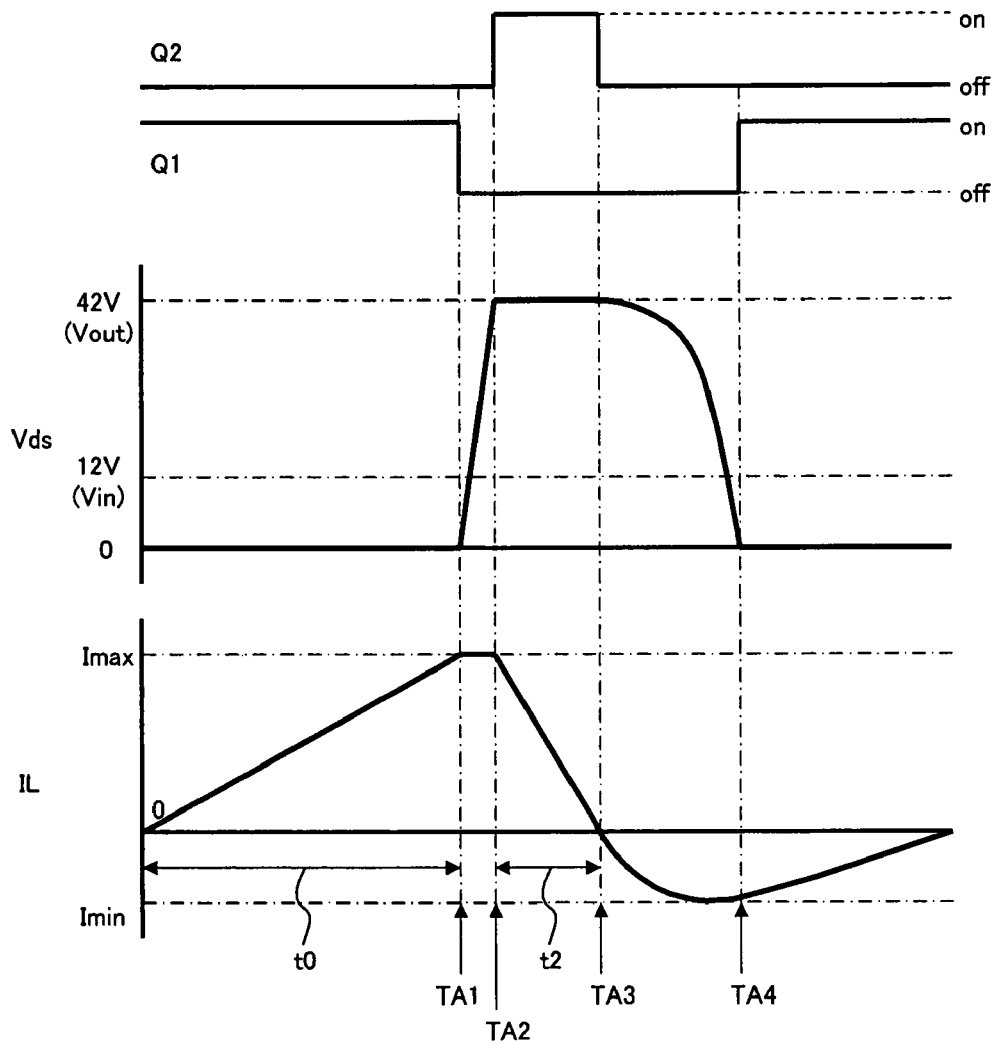
FIG. 1B is a timing chart showing the basic operation of zero current switching of the step-up switching regulator.
Figure 3A:
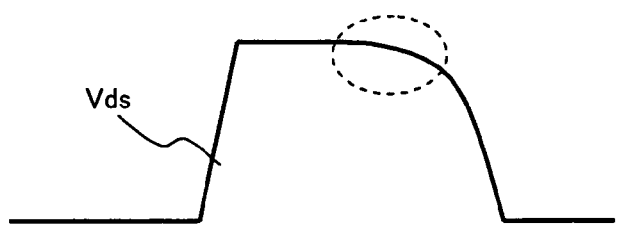
FIG. 3A is an explanatory view of the voltage fluctuation of a voltage Vds between the switch elements showing the basic operation of one period of zero current switching with respect to the synchronous switch element.

The fluctuation in the voltage Vds between the switch elements when the switch elements Q1, Q2 are controlled by the soft switch control section 20 will now be described. Similar to the description in FIG. 1B, the voltage Vds between the switch elements rises when the output voltage adjusting switch element Q1 is turned OFF, and the voltage Vds between the switch elements gradually lowers when the synchronous switch element Q2 is turned ON and then turned OFF, as shown in FIG. 3A. The region where the voltage Vds between the switch elements gradually lowers indicated by a circle of broken line in FIG. 3A is shown in an enlarged manner in FIG. 3B to FIG. 3D.

Figure 3B:
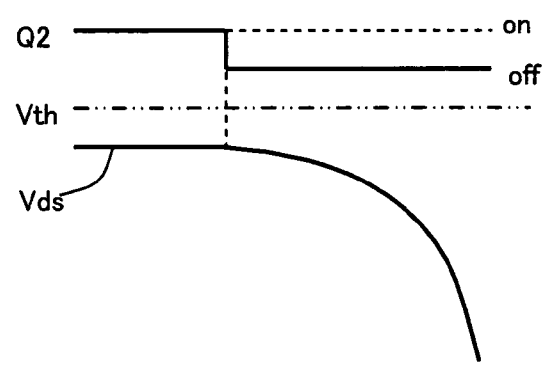
FIG. 3B is an explanatory view of the voltage fluctuation of the main part of the voltage Vds between the switch elements in time of an ideal zero current switching.

If the coil current IL is not flowing to the synchronous switch element Q2 at the instant the synchronous switch element Q2 is turned OFF by the soft switch control section 20, that is, if the zero current switching in which the timing of turning OFF the synchronous switch element Q2 is ideal is realized, the voltage Vds between the switch elements smoothly lowers without drastically fluctuating before and after the time of turning OFF of the synchronous switch element Q2, as shown in FIG. 3B.

Figure 3C:
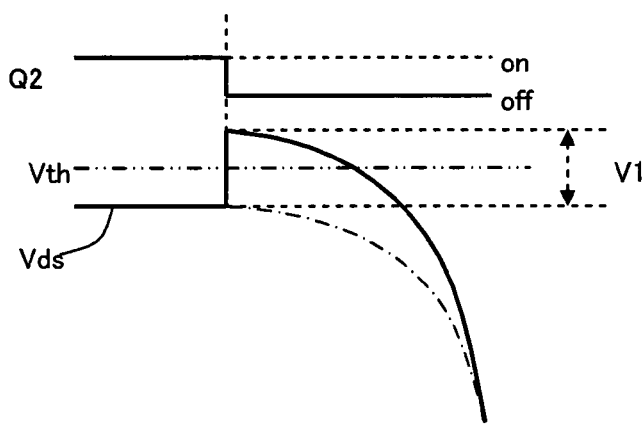
FIG. 3C is an explanatory view of the voltage fluctuation of the main part of the voltage Vds between the switch elements when turned OFF earlier than the ideal zero current switching.

However, if the coil current IL is flowing to the synchronous switch element Q2 from the input voltage terminal IN side to the output voltage terminal OUT side at the instant the synchronous switch element Q2 is turned OFF, that is, if the OFF timing of the synchronous switch element Q2 is early, the current flows via the parasitic diode D2 even after the synchronous switch element Q2 is turned OFF, and thus the voltage Vds between the switch elements rises by the voltage difference V1 produced by forward voltage drop of the parasitic diode D2, as shown in FIG. 3C. The characteristic indicated by a chain line in FIG. 3C is the characteristic of the voltage Vds between the switch elements shown in FIG. 3B.

Figure 3D:
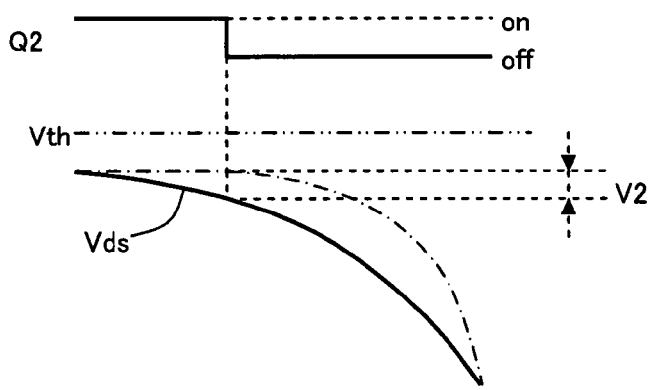
FIG. 3D is an explanatory view of the voltage fluctuation of the main part of the voltage Vds between the switch elements when turned OFF later than the ideal zero current switching.

If the coil current IL is flowing to the synchronous switch element Q2 from the output voltage terminal OUT side to the input voltage terminal IN side at the instant the synchronous switch element Q2 is turned OFF, that is, if the OFF timing of the synchronous switch element Q2 is late, the voltage Vds between the switch elements lowers by the voltage drop V2 produced by on-resistance of the synchronous switch element Q2, as shown in FIG. 3D. The characteristic indicated by a chain line in FIG. 3D is the characteristic of the voltage Vds between the switch elements shown in FIG. 3B.

The voltage detecting section 10 is arranged to detect the voltage Vds between the switch elements described above that fluctuates according to the timing of switching the synchronous switch element Q2 from ON to OFF.

As shown in FIG. 2, the voltage detecting section 10 includes a comparator circuit 11 for detecting the fluctuation in voltage at both ends of the synchronous switch element Q2, and a mask circuit 12 for retrieving the output from the comparator circuit 11 in time of turn-OFF of the synchronous switch element Q2. The comparator circuit 11 is configured by a comparator 111 and a constant voltage source 110 for inputting a reference voltage Vth to an inverted input terminal of the comparator 111, and a DC component shielding coupling capacitor C3 is arranged on the path from the connecting node of the switch elements Q1, Q2 to a non-inverted input terminal of the comparator 111.

The constant voltage source 110 is configured by a diode D3 having the cathode grounded, and a constant current source 112 connected in series to the anode side of the diode D3, where the anode of the diode D3 is connected to the inverted input terminal of the comparator circuit 11. The constant current source 112 is configured by a current mirror circuit, or the like.

The reference voltage Vth is set based on the forward voltage drop characteristic of the diode D3 with respect to the current supplied from the constant current source 112, and for example, is set to about 0.35V, which is a value ½ of the forward drop voltage Vf (about 0.7V) of the parasitic diode D2.

According to the above configuration, the fluctuation in the voltage Vds between the switch elements with respect to the reference voltage Vth having the ground as a reference is detected at satisfactory accuracy since the AC component is removed by the coupling capacitor C3. Furthermore, since the reference voltage Vth is set based on the forward voltage drop characteristic of the diode D3, when the voltage Vds between the switch elements fluctuates due to temperature characteristic of the parasitic diode D2, the reference voltage similarly changes following such fluctuation, thereby canceling out the influence of the temperature characteristic.

The mask circuit 12 is configured by a delay circuit 121 for outputting a mask signal obtained by delaying a gate drive signal SQ2 of the synchronous switch element Q2, which is output from the soft switch control section 20, by a predetermined time, and a logic circuit 122 input with the mask signal and the output signal of the comparator circuit 11.

The delay circuit 121 may be configured by a D-type flip-flop 121A including a data input terminal D to be input with the gate drive signal SQ2 and a clock input terminal CK to be input with a clock pulse CK of a predetermined frequency, and outputs the mask signal SMQ2 of high level obtained by delaying the gate drive signal SQ2 by a predetermined time by the clock pulse CK. The delay circuit 121 may also be configured by a CR delay circuit including a resistor and a capacitor or a known delay circuit using Schmidt trigger circuit etc.

The logic circuit 122 may be configured by a NAND circuit 122A and the like, where the output signal of the comparator circuit 11 is output to the soft switch control section 20 in the period the mask signal is at high level, and the signal of high level is constantly output to the soft switch control section 20 in the period the mask signal is at low level. That is, the signal of low level is output from the logic circuit 122 to the soft switch control section 20 only when the output signal of the comparator circuit 11 is at high level in the period the mask signal is at high level.

The output signal of the comparator circuit 11 in the period the mask signal is at high level, that is, in a predetermined period before and after the OFF timing of the synchronous switch element Q2 is input to the soft switch control section 20.

Figure 4:
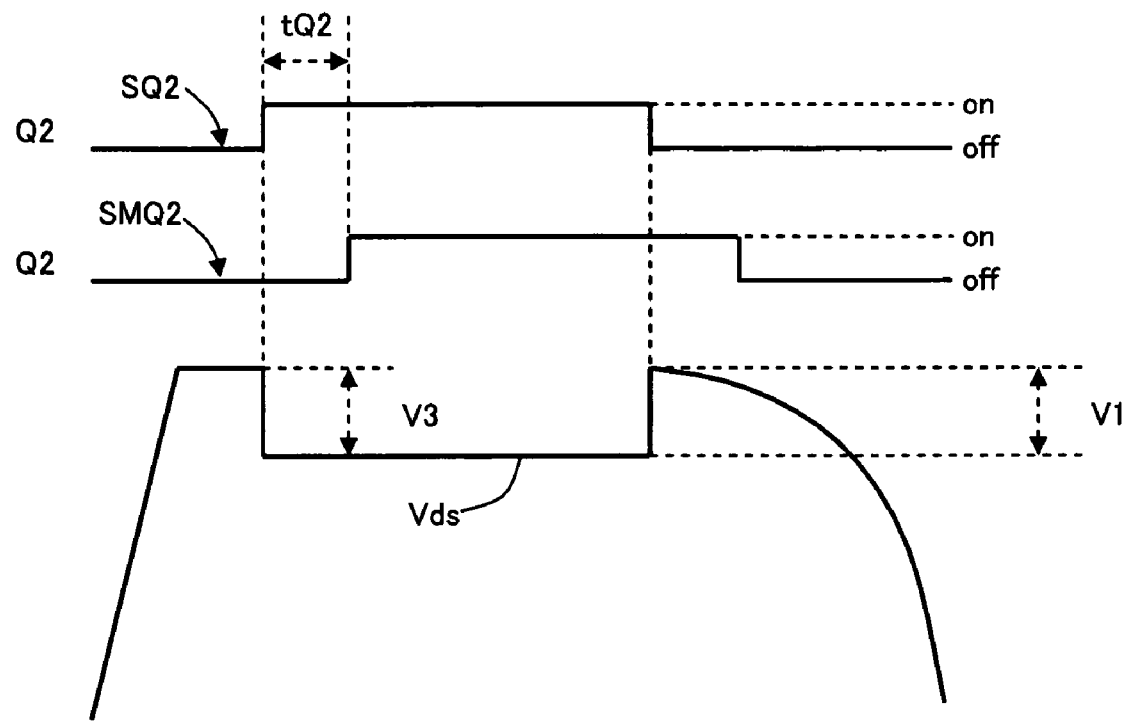
FIG. 4 is an explanatory view of the voltage fluctuation of the main part showing the potential difference that appears in the voltage Vds between the switch elements in time of turn-ON and turn-OFF of the synchronous switch element.

As shown in FIG. 4, the voltage Vds between the switch elements immediately after the gate drive signal SQ2 of the synchronous switch element Q2 is switched from OFF to ON lowers by the potential difference V3 due to the forward voltage drop of the parasitic diode D2. When the voltage Vds between the switch elements detected by the comparison circuit 11 at such timing is input to the soft switch control section 20, the potential difference V3 that is produced at the time the synchronous switch element Q2 is switched from OFF to ON may possibly be mistakenly detected as the potential difference V1 produced at the time the synchronous switch element Q2 is switched from ON to OFF, which is to be normally detected.

Therefore, the mask signal SMQ2 in which the ON period of the synchronous switch element Q2 is delayed by a predetermined time tQ2 in which the potential difference V3 is produced is generated by the mask circuit 12, and the voltage Vds between the switch elements is detected while the mask signal SMQ2 is at high level by the soft switch control section 20.

That is, detection is made by the voltage detecting section 10 on whether or not the timing of turning OFF the synchronous switch element Q2 is earlier than the zero current switching.

As shown in FIG. 3C, when the forward voltage drop of the parasitic diode D2 is produced in time of turn-OFF of the synchronous switch element Q2, and the voltage Vds between the switch elements becomes higher by the potential difference V1 (V1>Vth), the signal of high level is output from the comparator 111 and the signal of low level is output to the soft switch control section 20.

Furthermore, when the voltage Vds between the switch elements does not fluctuate in time of turn-OFF of the synchronous element Q2 as shown in FIG. 3B, or when the voltage Vds between the switch elements becomes lower than or equal to the reference voltage Vth by the reverse potential difference V2 in time of turn-OFF of the synchronous switch element Q2 as shown in FIG. 3D, the low level signal is output from the comparator 111 and the signal of high level is output to the soft switch control section 20.

The soft switch control section 20 performs extending correction (hereinafter also described as "extension corrects") the ON time of the synchronous switch element Q2 when judging that current is flowing to the output side in time of turn-OFF of the synchronous switch element Q2, that is, the OFF timing of the synchronous switch element Q2 is early based on the voltage fluctuation detected by the voltage detecting section 10.

Furthermore, the soft switch control section 20 performs reducing correction (hereinafter, also described as "reduction corrects") the ON time of the synchronous switch element Q2 when judging that current is not flowing to the output side in time of turn-OFF of the synchronous switch element Q2, that is, the OFF timing of the synchronous switch element Q2 is late based on the voltage fluctuation detected by the voltage detecting section 10.

Specifically, the soft switch control section 20 corrects the ON time of the synchronous switch element Q2 so as to be longer by a certain length of time, which is set in advance, from the current ON time when executing extending correction, and corrects the ON time of the synchronous switch element Q2 so as to be shorter by a certain length of time, which is set in advance, from the current ON time when executing reducing correction.

The soft switch control section 20 includes an output voltage adjusting unit 20a made up of logic arithmetic unit that monitors the voltage of the output terminal Vout to turn OFF the output voltage adjusting switch element Q1, and turns ON the output voltage adjusting switch element Q1 at the timing the voltage Vds between the switch elements becomes zero, and a zero current controlling unit 20b made up of a logic arithmetic unit that turns ON the synchronous switch element Q2 at the timing the voltage Vds between the switch elements becomes the output voltage, and calculates the timing at which the coil current IL becomes zero based on the voltage fluctuation detected by the voltage detecting section 10 to turn OFF the synchronous switch element Q2.

Figure 5:
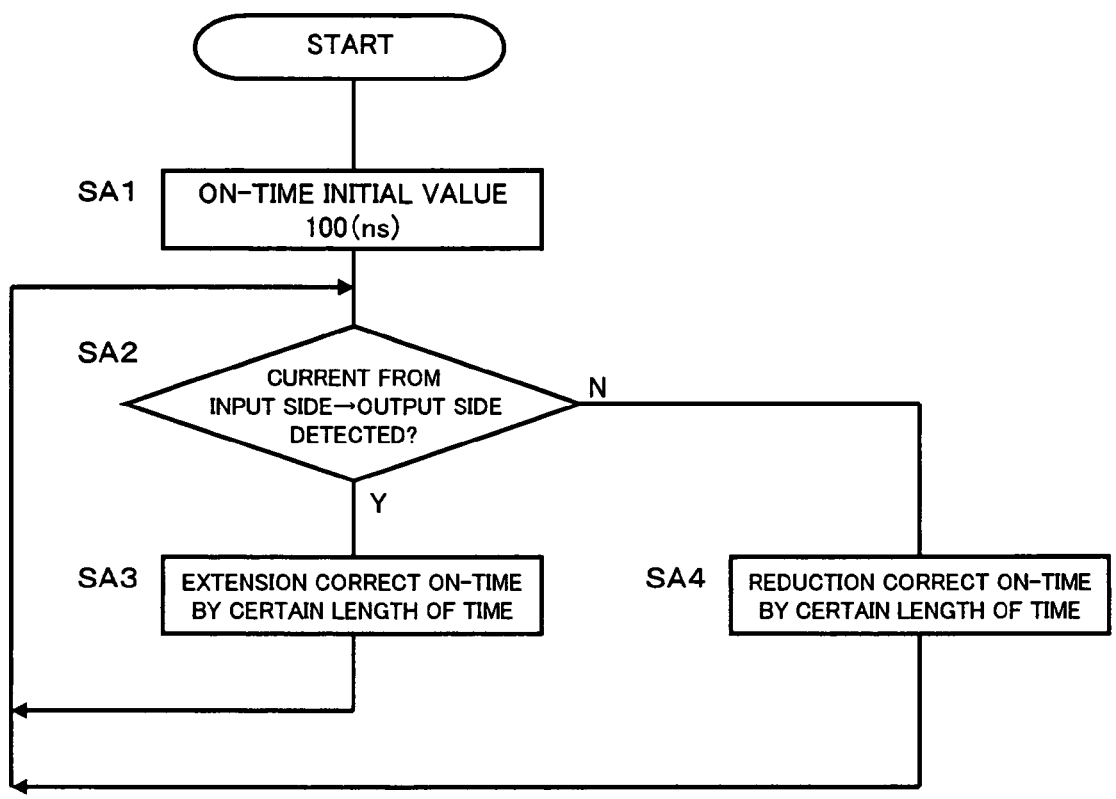
FIG. 5 is a control flowchart of a zero current switching by the soft switch control section shown in FIG. 2.

The OFF timing control of the synchronous switch element Q2 by the soft switch control section 20 will now be described based on the flowchart shown in FIG. 5.

The ON time of the synchronous switch element Q2 is set to a predetermined initial value in advance at the start of control of the soft switch control section 20 (SAD). The predetermined initial value is set to 100 ns (nanoseconds) in the present embodiment.

When detection is made by the voltage detecting section 10 that current is flowing to the synchronous switch element Q2 from the input side to the output side when the synchronous switch element Q2 is turned OFF (SA2), the soft switch control section 20 executes extending correction on the ON time of the synchronous switch element Q2 by a certain length of correction time set in advance (SA3).

In the present embodiment, when the certain length of correction time is set to 20 ns and detection is made by the voltage detecting section 10 that current is flowing to the synchronous switch element Q2 from the input side to the output side the first time, the ON time of the synchronous switch element Q2 is extended by 20 ns and corrected to 120 ns, and when similar detection is made by the voltage detecting section 10 the next time, the ON time is corrected to 140 ns.

When detection is made by the voltage detecting section 10 that current is not flowing to the synchronous switch element Q2 from the input side to the output side when the synchronous switch element Q2 is turned OFF (SA2), the soft switch control section 20 reduction corrects the ON time of the synchronous switch element Q2 by a certain length of correction time set in advance (SA4).

When detection is made by the voltage detecting section 10 that current is not flowing to the synchronous switch element Q2 from the input side to the output side the first time, the ON time of the synchronous switch element Q2 is reduced by 20 ns and corrected to 80 ns, and when similar detection is made by the voltage detecting section 10 the next time, the ON time is further corrected to 60 ns.

According to the configuration described above, the ON time can approach the optimum time to become the ideal zero current switching since the ON time of the synchronous switch element Q2 is extension corrected or reduction corrected at an interval of 20 ns by the soft switch control section 20, and thereafter, extension and reduction are repeated in units of 20 ns, thereby guaranteeing a substantially optimum ON time. The processing load of the soft switch control section 20 is also small since the process only involves addition or subtraction of a certain length of time, set in advance.

Another embodiment of a correction control by the soft switch control section 20 will now be described. A configuration in which extending correction or reducing correction is executed in units of a certain length of correction time of 20 ns by the soft switch control section 20 has been described in the above embodiment, but the correction time is not fixed to 20 ns, and may be appropriately set to an optimum fixed value based on specific circuit configuration. The correction time for extending or reducing the ON time of the synchronous switch element Q2 may be differed based on the past voltage fluctuation history detected by the voltage detecting section 10.

Figure 6:
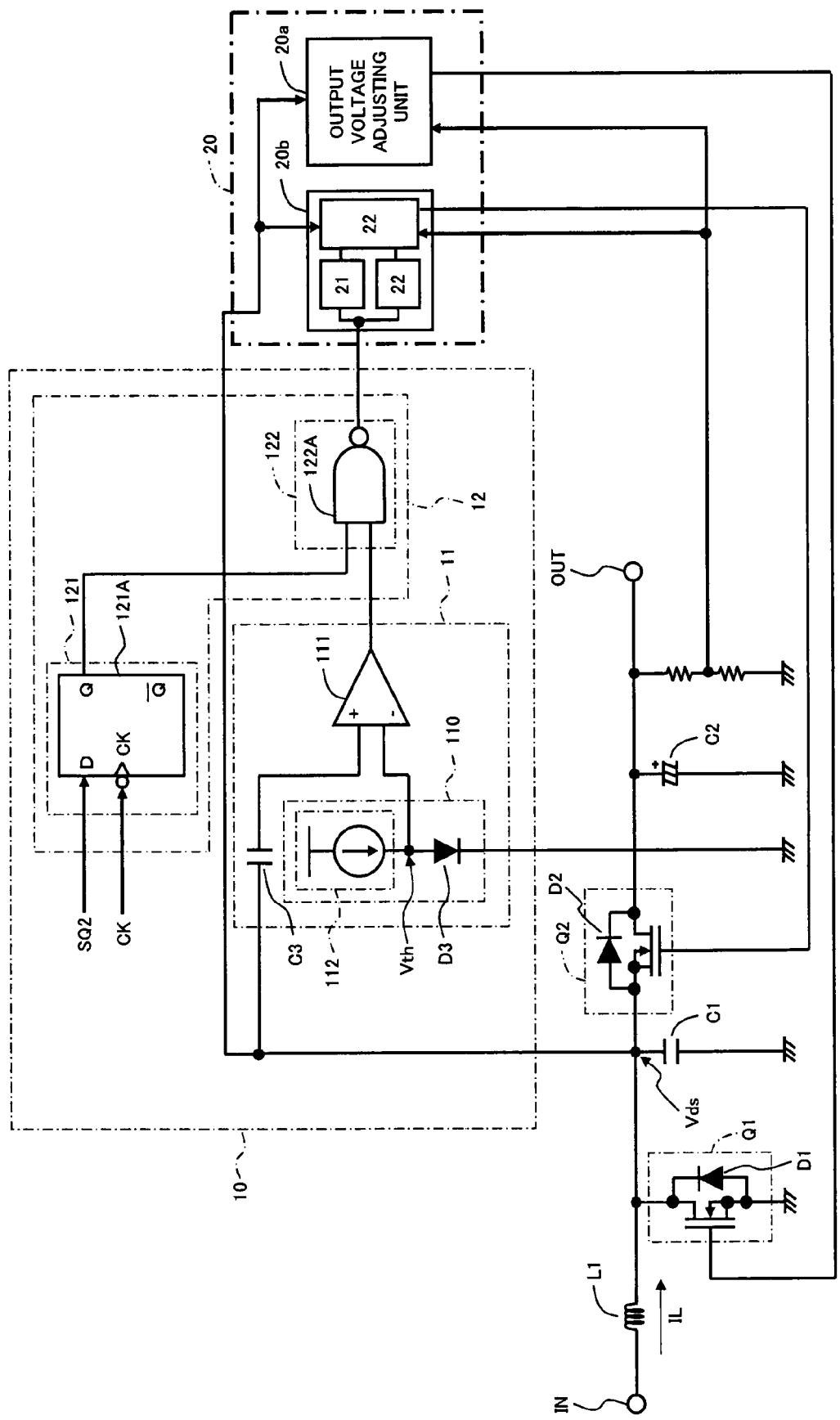
FIG. 6 is a circuit diagram showing another embodiment of a step-up half bridge switching regulator.

As shown in FIG. 6, for instance, a configuration may be adopted in which the zero current controlling unit 20b is arranged with an up counter 21 for counting and storing the number of times the extending correction has been continuously executed, a down counter 22 for counting and storing the number of times the reducing correction has been continuously executed, and a correction control part 23 for calculating the correction time based on the values of the counters and controlling the synchronous switch element Q2, where the correction control part 23 executes the extending correction with the time obtained by multiplying either the value stored in the up counter 21 or the correction factor corresponding to the relevant value to the correction time of the initial value set in advance as a new correction time, or executes the reducing correction with the time obtained by multiplying either the value stored in the down counter 22 or the correction factor corresponding to the relevant value to the correction time as a new correction time.

If the initial value of the correction time is set to a short value and the correction factor is set such that the correction time gradually becomes longer in accordance with the value of each counter indicating the past voltage fluctuation history, the optimum time to become the ideal zero current switching can be reached faster and the subsequent fluctuation can be suppressed small; whereas if the initial value of the correction time is set to a long value and the correction factor is set such that the correction time gradually becomes shorter in accordance with the value of each counter, the correction time becomes shorter as the optimum time to become the ideal zero current switching is approached, and overshoot can be avoided.

Figure 7:
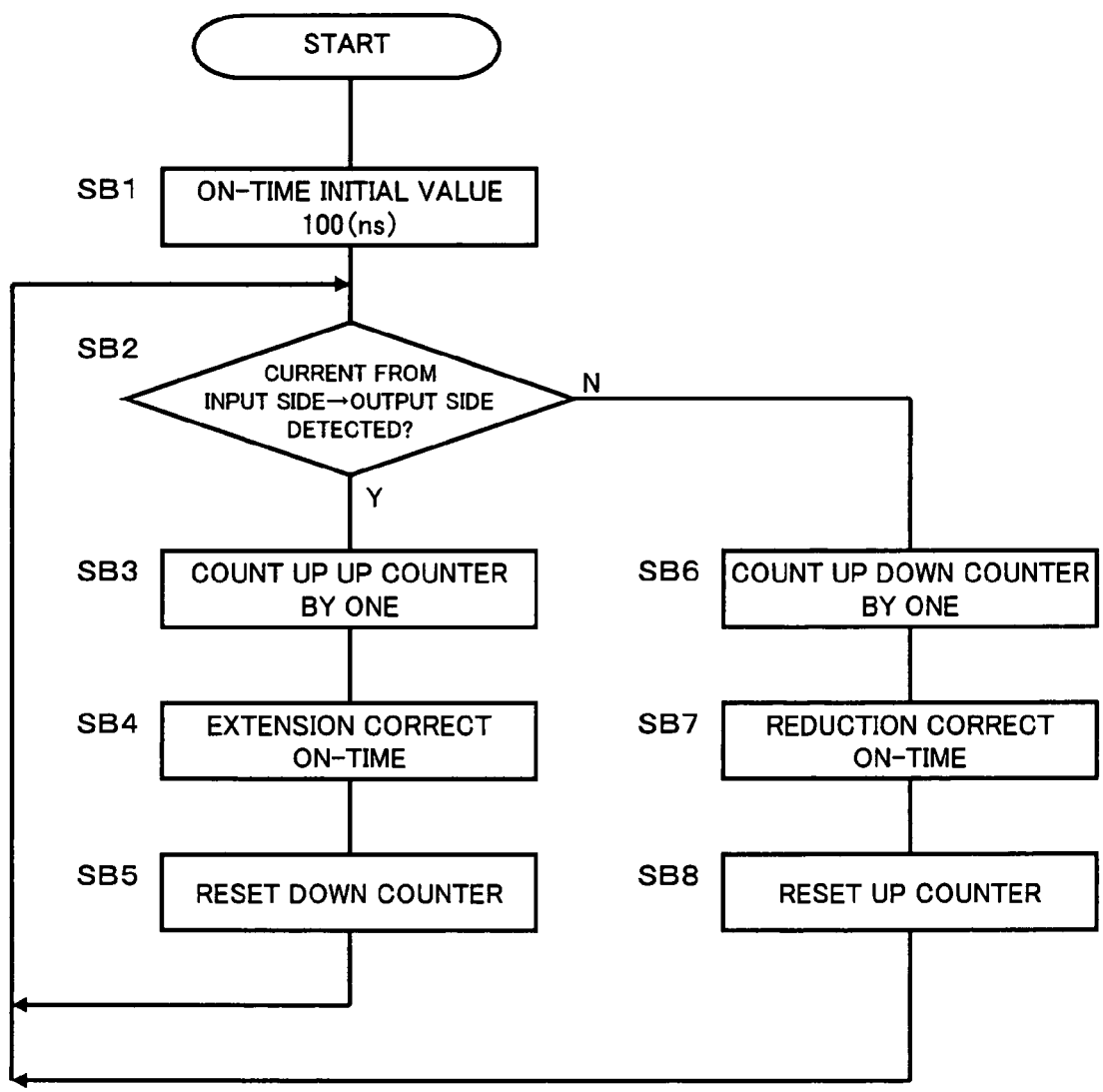
FIG. 7 is a control flowchart of zero current switching by the soft switch control section shown in FIG. 6.

The OFF timing control of the synchronous switch element Q2 by the soft switch control section 20 when such configuration is adopted will be described based on the flowchart shown in FIG. 7.

The ON time of the synchronous switch element Q2 is set to a predetermined initial value in advance at the start of control of the soft switch control section 20 (SB1). The predetermined initial value is set to 100 ns and the initial values of the up counter 21 and the down counter 22 are set to zero in the present embodiment.

When detection is made by the voltage detecting section 10 that current is flowing to the synchronous switch element Q2 from the input side to the output side when the synchronous switch element Q2 is turned OFF (SB2), the soft switch control section 20 counts up the up counter 21 by one (SB3), extension corrects the ON time of the synchronous switch element Q2 by the value obtained by multiplying the value stored in the up counter 21 to the certain length of correction time set in advance (SB4), and resets the value stored in the down counter 22 (SB5).

When the certain length of correction time is set to 20 ns and detection is made by the voltage detecting section 10 that current is flowing to the synchronous switch element Q2 from the input side to the output side the first time, the ON time of the synchronous switch element Q2 is extended by 20 ns×1 and corrected to 120 ns(=100+20×1) (SB3), and when similar detection is made by the voltage detecting section 10 the next time, the value of the up counter 21 is counted up to 2 (SB3), and the ON time is extended by 20 ns×2=40 ns and corrected to 160 ns(=120+20×2) (SB4).

When detection is made by the voltage detecting section 10 that current is not flowing to the synchronous switch element Q2 from the input side to the output side when the synchronous switch element Q2 is turned OFF (SB2), the soft switching control section 20 counts up the down counter 22 by one (SB6), reduction corrects the ON time of the synchronous switch element Q2 by the value obtained by multiplying the value stored in the down counter 22 to the certain length of correction time set in advance (SB7), and resets the value stored in the up counter 21 (SB8).

When detection is made by the voltage detecting section 10 that current is not flowing to the synchronous switch element Q2 from the input side to the output side the first time, the ON time of the synchronous switch element Q2 is reduced by 20 ns×1 and corrected to 80 ns(=100−20×1) (SB7), and when similar detection is made by the voltage detecting section 10 the next time, the value of the down counter 22 is counted up to 2 (SB6), and the ON time is reduced by 20 ns×2=40 ns and corrected to 40 ns(=80−20×2) (SB7).

According to the above configuration, since the extending correction amount or the reducing correction amount changes based on the voltage fluctuation history, the correction amount gradually increases and the ON time can approach the optimum time more faster when extending correction or reducing correction is continuously executed by the soft switch control section 20.

In the embodiment described above, a case where the correction time of the extending correction or the reducing correction is calculated with a predetermined calculation formula based on the value of the up counter or the down counter storing the past voltage fluctuation history by the soft switch control section 20 has been described, but correction amount map data in which the extending correction time or the reducing correction time is set in correspondence to the value of the up counter or the down counter may be arranged in the soft switch control section 20, so that the soft switch control section 20 executes extending correction or reducing correction on the ON time of the synchronous switch element Q2 based on the correction amount map data.

Figure 8:
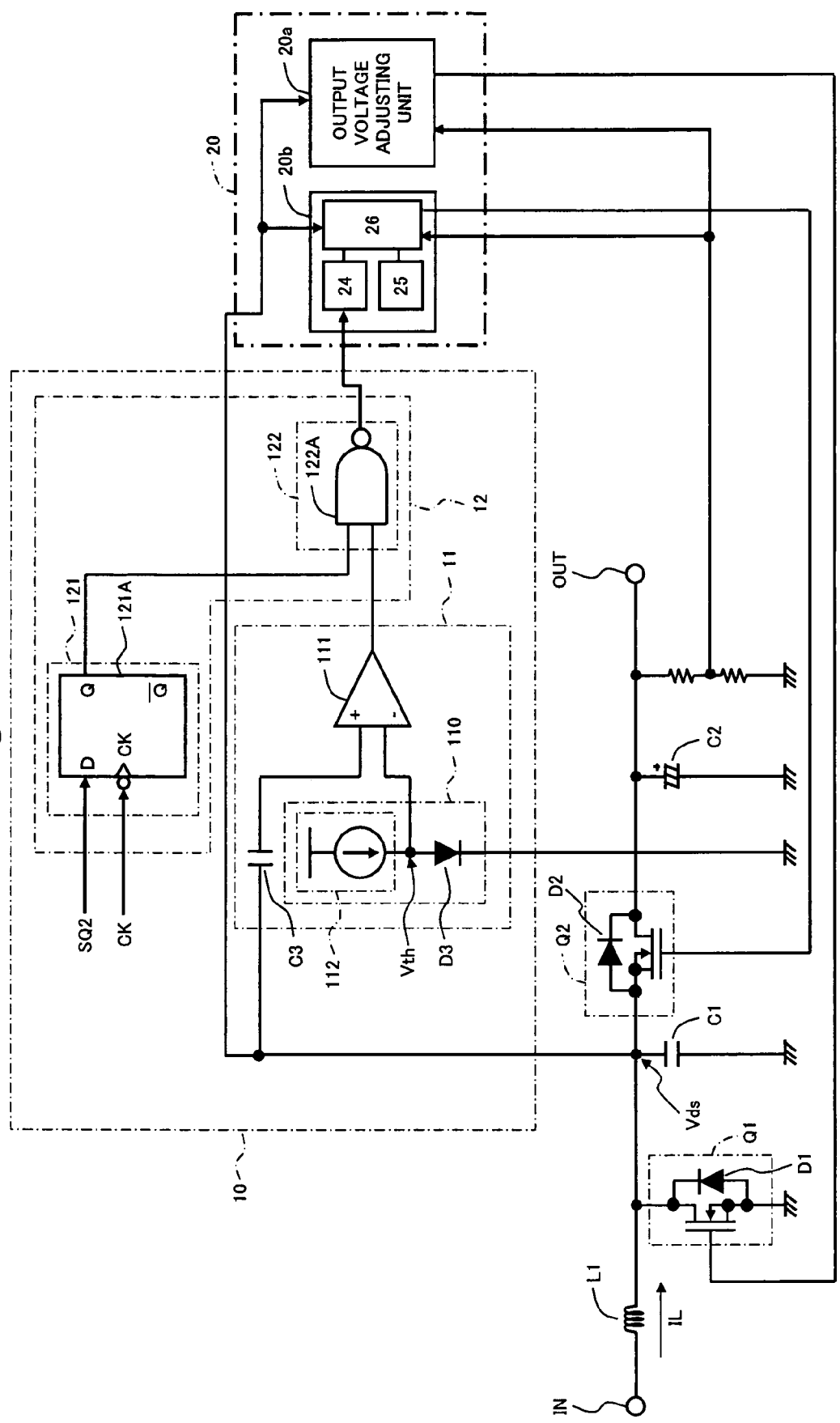
FIG. 8 is a circuit diagram showing another embodiment of the step-up half bridge switching regulator.

One example will be described below. As shown in FIG. 8, the zero current controlling unit 20b is arranged with a memory for storing the correction amount map data 25 defining the correction time when executing reducing correction on the ON time of the synchronous switch element Q2, a map down counter 24 for specifying the target correction time from the correction amount map data 25, and a correction control part 26 for obtaining the reducing correction time corresponding to the value of the map down counter 24 from the correction amount map data 25 and executing the reducing correction, and correcting the extension time with the certain length of correction time set in advance.

Figure 9:
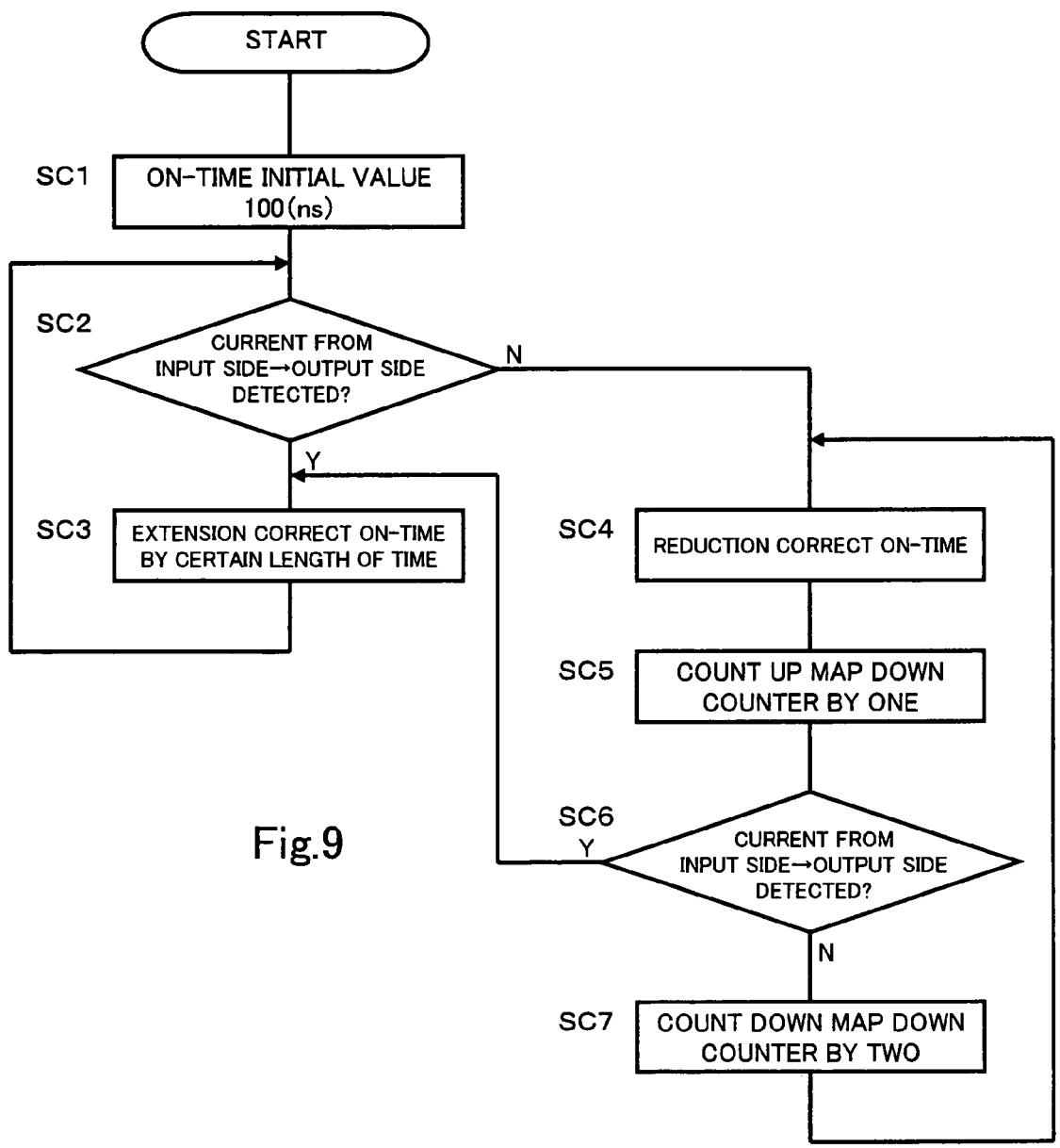
FIG. 9 is a control flowchart of zero current switching by the soft switch control section shown in FIG. 8.

The OFF timing control of the synchronous switch element Q2 by the soft switch control section 20 when such configuration is adopted will be described based on the flowchart shown in FIG. 9.

The ON time of the synchronous switch element Q2 is set to a predetermined initial value in advance at the start of control of the soft switch control section 20 (SC1). The predetermined initial value is set to 100 ns, the initial value of the map down counter 24 is set to 1, and the maximum value thereof is limited to 3 in the present embodiment. As shown in FIG. 9, the correction amount map data 25 is set so as to become shorter as the value of the map down counter 24 increases.

When detection is made by the voltage detecting section 10 that current is flowing to the synchronous switch element Q2 from the input side to the output side when the synchronous switch element Q2 is turned OFF (SC2), the soft switch control section 20 extension corrects the ON time of the synchronous switch element Q2 by the certain length of time, set in advance (SC3).

In the present embodiment, when the extending correction time is set to 20 ns and detection is made by the voltage detecting section 10 that current is flowing to the synchronous switch element Q2 from the input side to the output side the first time, the ON time of the synchronous switch element Q2 is extended by 20 ns and corrected to 120 ns (=100+20), and when similar detection is made by the voltage detecting section 10 the next time, the ON time is corrected to 140 ns (=120+20).

When detection is made by the voltage detecting section 10 that current is not flowing to the synchronous switch element Q2 from the input side to the output side when the synchronous switch element Q2 is turned OFF (SC2), the soft switch control section 20 selects the reducing correction time corresponding to the count value of the map down counter 24 from the correction amount map data 25 shown in FIG. 10, reduction corrects the ON time of the synchronous switch element Q2 (SC4), and counts up the map down counter 24 by one (SC5).

When detection is made by the voltage detecting section 10 that current is flowing to the synchronous switch element Q2 from the input side to the output side when the synchronous switch element Q2 is turned OFF as a result of reducing correction executed in step SC4 (SC6), the extending correction process of step SC3 is executed to correct the overcorrection, and the process returns to step SC2.

When detection is made by the voltage detecting section 10 that current is not flowing to the synchronous switch element Q2 from the input side to the output side in step SC6, the map down counter 24 is reduced by two (SC7), and the process returns to step SC4.

That is, When detection is made by the voltage detecting section 10 that current is not flowing to the synchronous switch element Q2 from the input side to the output side the first time, the ON time of the synchronous switch element Q2 is reduction corrected by 200 ns in correspondence to the value 1 of the map down counter 24 shown in FIG. 10, when similar detection is made the second time, the ON time of the synchronous switch element Q2 is reduction corrected by 100 ns in correspondence to the value 2 of the map down counter 24, and when similar detection is made the third and subsequent times, the ON time of the synchronous switch element Q2 is reduction corrected by 50 ns in correspondence to the value 3 of the map down counter 24.

Assumption is made that reducing correction is not continuously performed in the present embodiment since the ON time is reduction corrected to a large extent of 200 ns and 100 ns when the value of the map down counter 24 is 1 or 2, respectively.

If the necessity to continuously execute the reducing correction arises when the value of the map down counter 24 is 3, the value of the map down counter 24 is counted down by two in step SC7, and consequently, the ON time of synchronous switch element Q2 is reduction corrected by 200 ns in correspondence to the value 1 of the map down counter 24.

Figure 11:
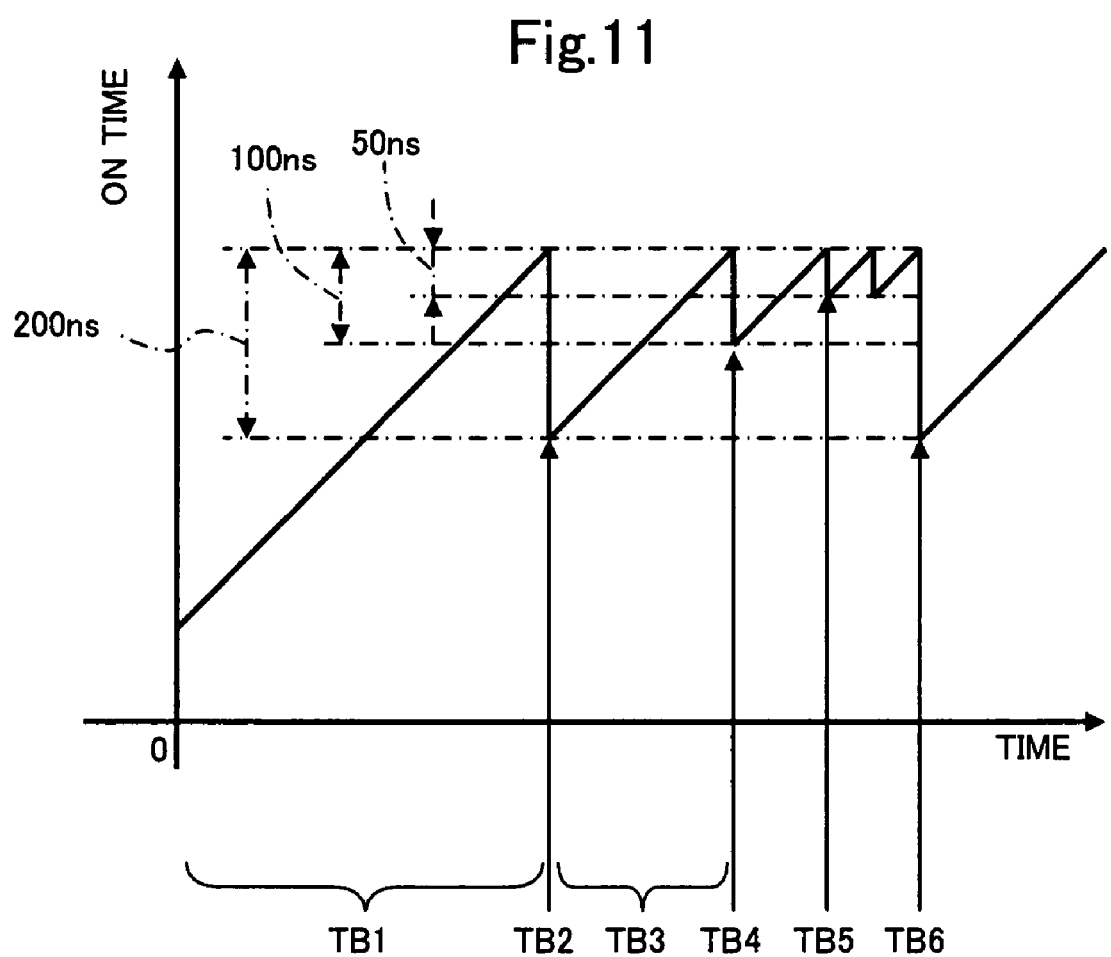
FIG. 11 is an explanatory view showing the fluctuation on ON time of the synchronous switch element controlled by the soft switch control section shown in FIG. 8.

The control characteristic with respect to the ON time of the synchronous switch element Q2 will now be described based on the timing chart shown in FIG. 11.

Initially, the extending correction process of step SC3 is repeated, and the ON time of the synchronous switch element Q2 gradually increases in period TB1. Subsequently, When detection is made by the voltage detecting section 10 that current is not flowing to the synchronous switch element Q2 from the input side to the output side at time TB2, the ON time is reduction corrected to the ON time obtained by subtracting 200 ns from the ON time of the synchronous switch element Q2 immediately before in correspondence to the counter value 1 of the map down counter 24.

The extending correction process of step SC3 is again repeated, and the ON time of the synchronous switch element Q2 gradually increases in period TB3. Subsequently, when detection is made by the voltage detecting section 10 that current is not flowing to the synchronous switch element Q2 from the input side to the output side at time TB4, the ON time is reduction corrected to the ON time obtained by subtracting 100 ns from the ON time of the synchronous switch element Q2 immediately before in correspondence to the counter value 2 of the map down counter 24.

The extending correction process of step SC3 is then again repeated, and the ON time of the synchronous switch element Q2 gradually increases in this period. Subsequently, when detection is made by the voltage detecting section 10 that current is not flowing to the synchronous switch element Q2 from the input side to the output side at time TB5, the ON time is reduction corrected to the ON time obtained by subtracting 50 ns from the ON time of the synchronous switch element Q2 immediately before in correspondence to the counter value 3 of the map down counter 24.

Thereafter, the extending correction process at the extending correction time of 20 ns and the reducing correction process at the reducing correction time of 50 ns are repeated, and the ON time is reduction corrected to the ON time obtained by subtracting 200 ns from the ON time of the synchronous switch element Q2 immediately before when the reducing correction process continues as in time TB6. The reducing correction time is set to 100 ns when the counter value of the map down counter 24 is changed from 2 to 1 in step SC7.

That is, the ON time of the synchronous switch element Q2 is initially reduction corrected to a large extent and then gradually reduction corrected to a small extent according to the correction amount map data 25, so that the fluctuation due to correction becomes smaller as the ON time approaches the optimum time to become zero current switching. The reducing correction amount becomes large when the shift from the optimum time becomes large for some reason.

The upper limit value of the map down counter 24 is not limited to 3, and the present invention may be configured to be countable with a greater value for the upper limit value and the correction amount map data 25 can be set according to such upper limit value, whereby the set value of the correction amount map data 25 is also not limited to the above value.

A case where the correction amount map data is used when reduction correcting the ON time of the synchronous switch element Q2 has been described in the above embodiment, but the correction amount map data may be used in extending correction, or the correction amount map data may be used in both reducing correction and extending correction.

The value of the correction amount map data may be set so that the reducing correction time or the extending correction time is long when the value of the map counter at the early stage of control is small, and the reducing correction time or the extending correction time gradually shortens as the value of the map counter becomes larger, so that the timing for turning OFF the synchronous switch element Q2 approaches timing for the zero current switching faster, and the switching loss by the subsequent fluctuation can be reduced. timing for turning OFF the synchronous switch element is earlier than zero current switching;

The three modes of correction control (certain length of correction time, variable correction time based on voltage fluctuation history, variable correction time based on correction amount map data) described above by the soft switch control section 20 may be appropriately combined. For instance, the extending correction may be executed with the variable correction time based on the voltage fluctuation history and the reducing correction may be executed with the variable correction time based on the correction amount map data.

A case where the output voltage adjusting switch element Q1 and the synchronous switch element Q2 are configured by n-channel MOS-FET has been described in the embodiment described above, but the switch elements Q1, Q2 may be configured by bipolar transistor. In this case, a flywheel diode must be separately arranged between the collector terminal and the emitter terminal of the bipolar transistor.

The logic circuit 122 arranged in the voltage detecting section 10 is configured by the NAND circuit 122A in the embodiment described above, but is not limited to be configured by the NAND circuit, and may be configured by an arbitrary gate circuit having a function similar to the NOR circuit and the like as long as a gate function for passing the output signal from the comparison circuit 11 based on the output signal from the delay circuit 121 is provided to avoid erroneous detection of the voltage Vds between the switch elements at the time of switching the synchronous switch element Q2 from ON to OFF.

Furthermore, a software filter for detecting the output signal of the comparison circuit 11 from the time a predetermined time has elapsed from the ON time of the synchronous switch element Q2 until the time a predetermined time has elapsed from the OFF time of the synchronous switch element Q2 may be arranged in the soft switch control section 20. In this case, the mask circuit 12 that is realized by a hardware circuit is unnecessary.

Figure 12:
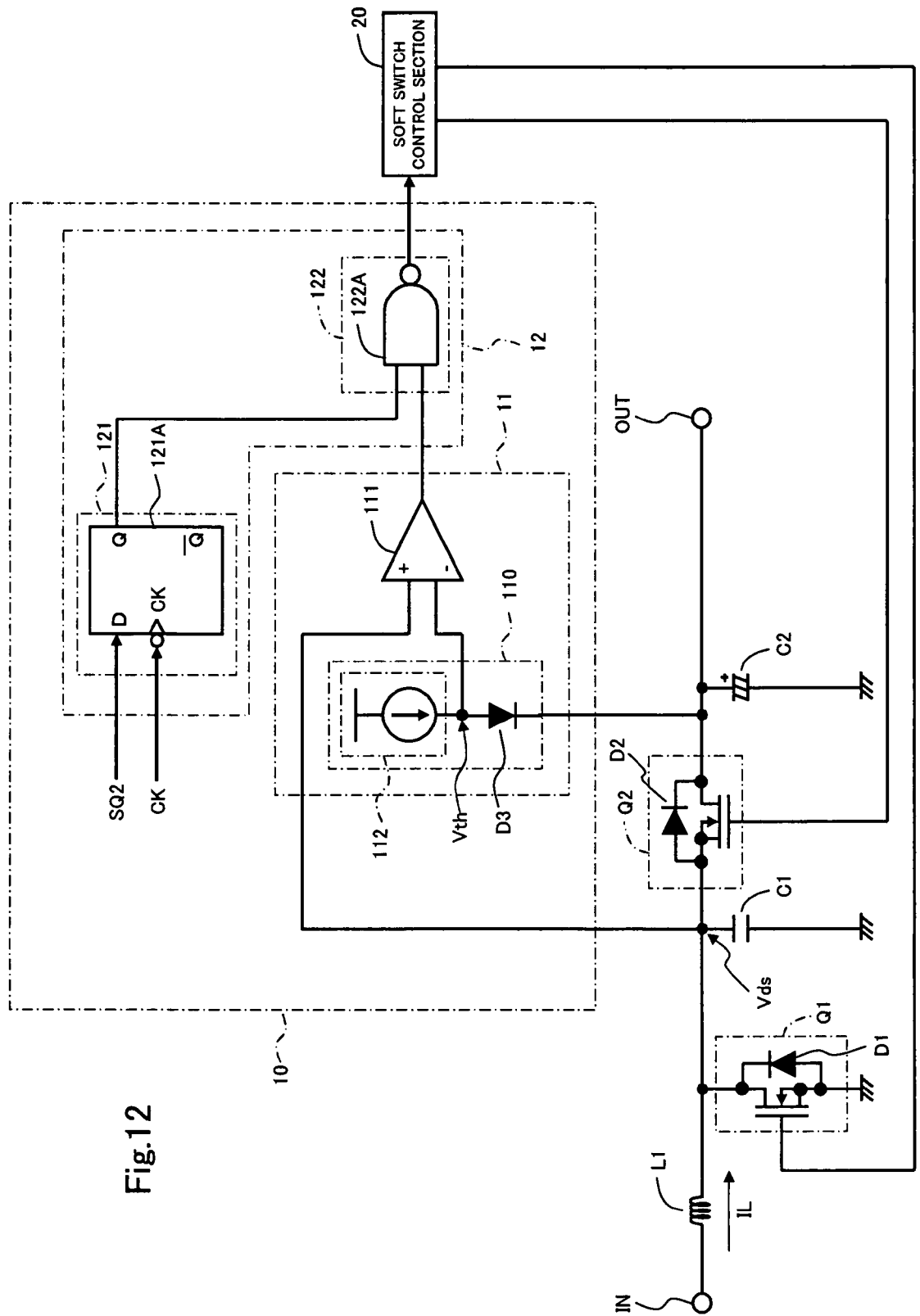
FIG. 12 showing another embodiment is a circuit diagram of the step-up half bridge switching regulator with the coupling capacitor omitted from the circuit diagram shown in FIG. 2.

A configuration of arranging the DC component shielding coupling capacitor C3 in the path from the connecting node of the switch elements Q1, Q2 to the non-inverted input terminal of the comparator 111 in the comparator circuit 11 has been described in the above embodiment, but the connecting node of the switch elements Q1, Q2 and the non-inverted input terminal of the comparator 111 may be directly connected without arranging the coupling capacitor C3, as shown in FIG. 12.

In this case, the cathode of the diode D3 configuring the constant voltage source 110 is connected to the drain terminal of the synchronous switch element Q2.

Figure 13:
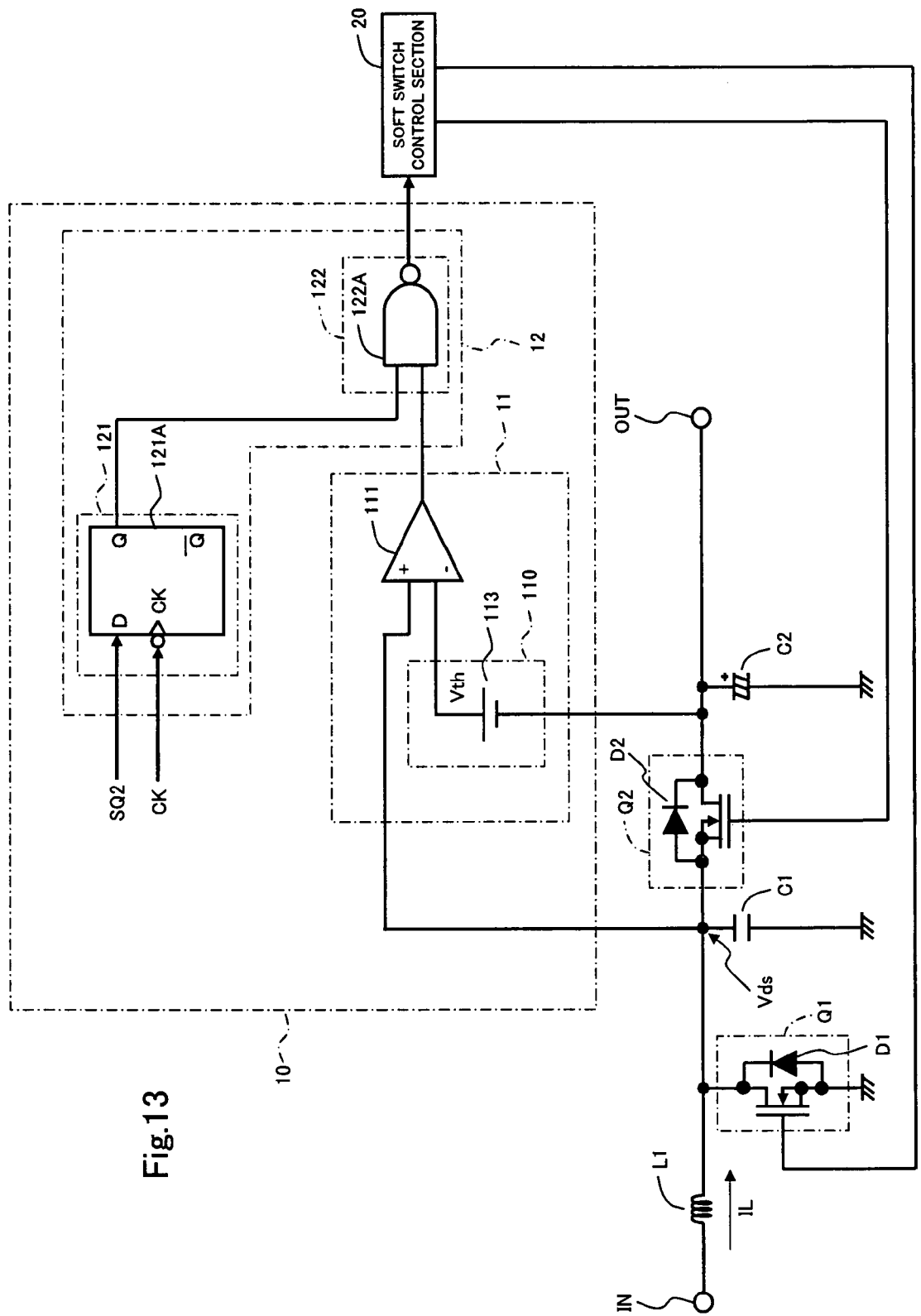
FIG. 13 is a circuit diagram of a step-up half bridge switching regulator showing another embodiment of a constant voltage source.

A configuration in which the constant voltage source 110 is configured by the constant current source 112 and the diode D3 has been described in the embodiment described above, but the constant voltage source 110 is not limited to such circuit configuration, and may be configured by a constant voltage circuit 113 for generating the reference voltage Vth using a Zener diode, or a known constant voltage circuit 113 for generating the reference voltage Vth using an operational amplifier, as shown in FIG. 13.

A case where the correction amount map data in the soft switch control section 20 is set to a fixed value in advance has been described in the embodiment described above, but a general switching regulator capable of responding to the coil having an arbitrary inductance value may be configured by configuring such that the correction amount map data is variably set based on the inductance value of the step-up coil connected to the connecting node of the switch elements Q1, Q2.

Furthermore, a plurality of sets of correction amount map data may be arranged in correspondence to the inductance values of a plurality of step-up coils having the possibility of being used in the soft switch control section 20, and the suitable correction amount map data may be used from the plurality of sets of correction amount map data based on the inductance value automatically detected by the soft switch control section 20 or set and input to the soft switch control section 20.

A case where the initial value of the ON time of the synchronous switch element is set to a fixed value in advance has been described in the embodiment described above, but the initial value may be variably set based on the inductance value of the step-up coil.

Moreover, a plurality of initial values may be stored in the storage section in correspondence to the inductance values of the plurality of step-up coils having the possibility of being used in the soft switch control section 20, and the suitable initial value may be used from the plurality of initial values based on the inductance value automatically detected by the soft switch control section 20 or set and input to the soft switch control section 20.

A case where the voltage detecting section 10 for detecting the presence of current flowing from the input side to the output side at the instant the synchronous switch element Q2 is turned OFF based on the potential difference V1 produced by the parasitic diode D2 is arranged, and the OFF timing of the synchronous switch element Q2 is controlled by the soft switch control section 20 has been described in the above embodiment, but a configuration in which the voltage detecting section 10 for detecting the presence of the current flowing from the output side to the input side at the instant the synchronous switch element Q2 is turned OFF based on the reverse potential difference V2 produced by the on-resistance of the synchronous switch element Q2 is arranged, and the OFF timing of the synchronous switch element Q2 is controlled by the soft switch control section 20 may be adopted.

Figure 14:
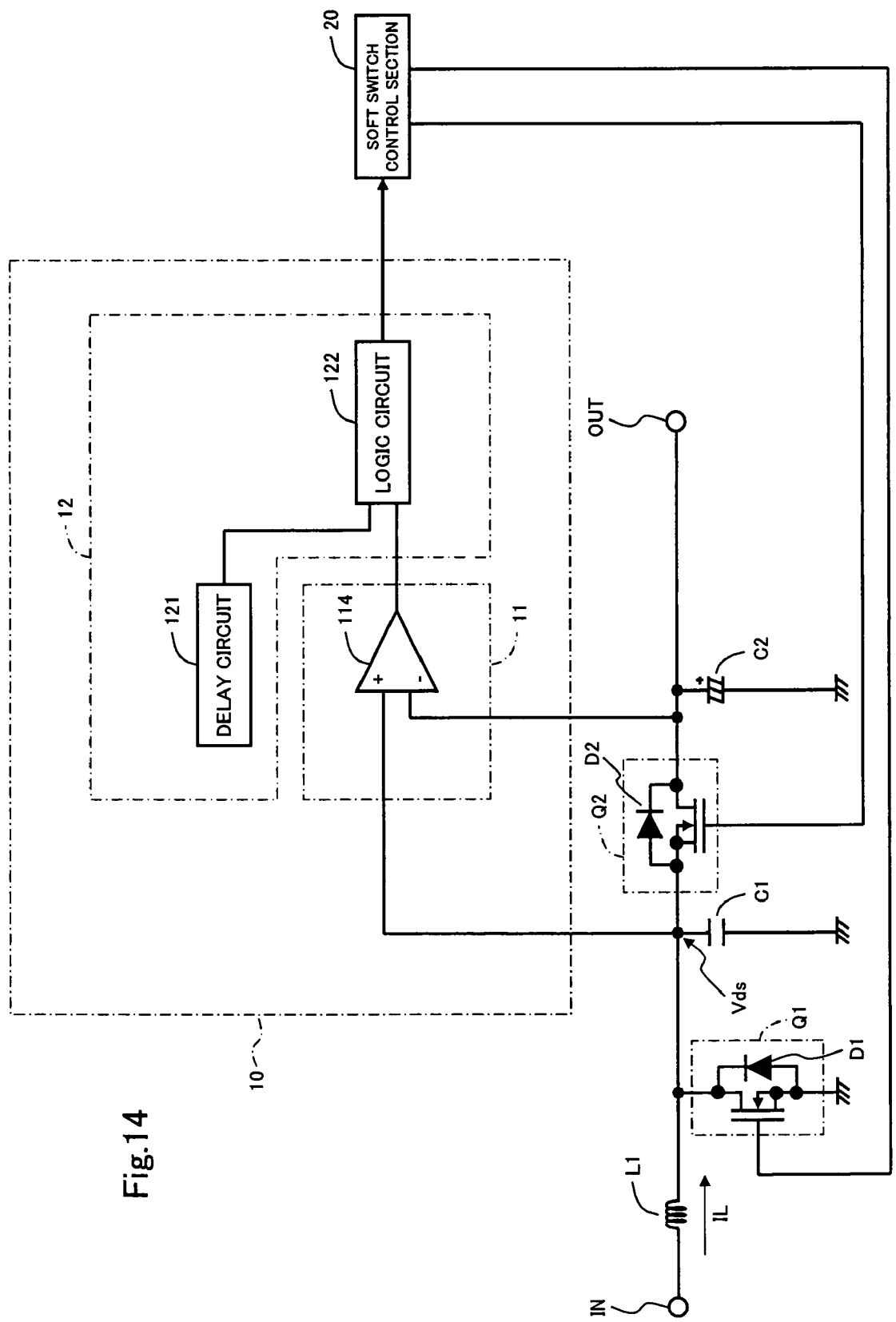
FIG. 14 is a circuit diagram of a step-up half bridge switching regulator including a voltage detecting section for detecting whether or not the timing for turning OFF the synchronous switch element is later than zero current switching.

In this case, the comparator circuit 11 incorporated in the voltage detecting section 10 is configured by a comparator 114 having the non-inverted input terminal connected with the source terminal of the synchronous switch element Q2 and the inverted input terminal connected with the drain terminal, as shown in FIG. 14.

That is, detection is made on whether or not the timing to turn OFF the synchronous switch element Q2 is later than the zero current switching by the voltage detecting section 10.

The soft switch control section 20 then executes correction so that the ON time of the synchronous switch element Q2 becomes shorter when judged that current is flowing from the output side to the input side, and executes correction so that the ON time of the synchronous switch element Q2 becomes longer when judged that current is not flowing to the input side at the turn-OFF of the synchronous switch element Q2 based on the voltage fluctuation detected by the voltage detecting section 10. Such correction process is realized with the idea similar to the flowchart shown in FIGS. 5, 7, and 9 described above.

A step-up half bridge switching regulator has been described in the embodiment described above, but the present invention is also applicable to a step-down half bridge switching regulator.

Figure 15:
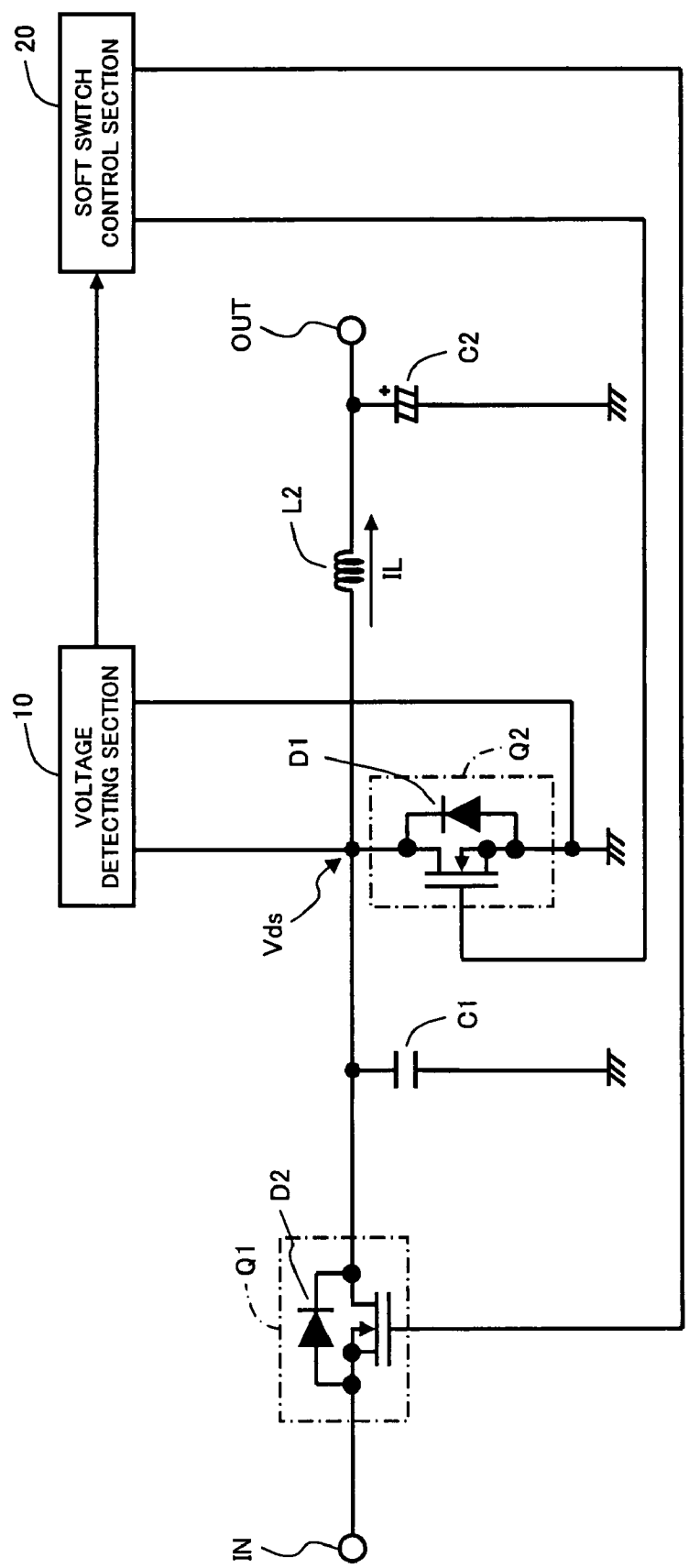
FIG. 15 showing another embodiment is a circuit diagram of a step-down half bridge switching regulator.

As shown in FIG. 15, the step-down half bridge switching regulator may be configured by the output voltage adjusting switch element Q1 for adjusting the output voltage; the synchronous switch element Q2, connected in series with the output voltage adjusting switch element Q1, that is complementary ON operated when the output voltage adjusting switch element Q1 is turned OFF; the voltage detecting section 10 for detecting the voltage at the connecting node of the switch elements in time of turn-OFF of the synchronous switch element Q2; and the soft switch control section 20 for adjusting the timing of turn-OFF of the synchronous switch element Q2 based on the voltage fluctuation detected by the voltage detecting section 10.

Specifically, the source terminal of the output voltage adjusting switch element Q1 is connected to the input voltage terminal IN, and the drain terminal is connected to the output voltage terminal OUT with the step-down coil L2 in between. Furthermore, the drain terminal of the synchronous switch element Q2 is connected to the output voltage terminal OUT with the step-down coil L2 in between, and the source terminal is grounded. That is, the switch elements Q1, Q2 are connected in series between the input terminal IN and the ground.

Figure 16:
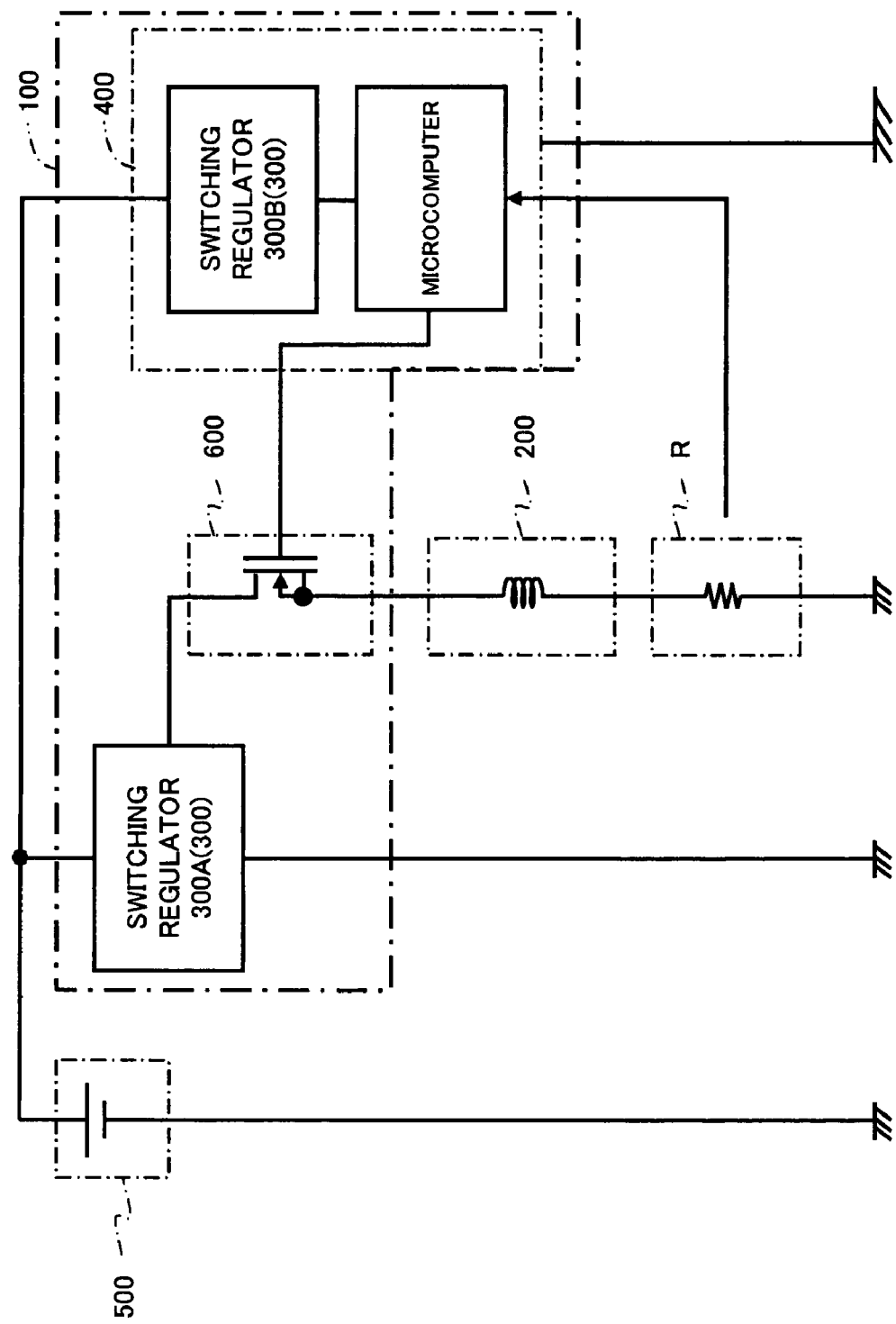
FIG. 16 is an explanatory view of electronic device incorporating the half bridge switching regulator.

As shown in FIG. 16, the electronic device 100 serving as a control unit may be configured by incorporating the half bridge switching regulator according to the present invention in the control section 400 equipped with a microcomputer for controlling the power supply to the load 200 of the device that is power supplied from the switching regulator 300A.

The control section 400 is configured by a low voltage (e.g., DC5V) switching regulator 300B, and peripheral circuits such as a microcomputer that is power supplied from the switching regulator 300B and MOS-FET 600 for supplying power to the load 200, so that current or voltage flowing to the load 200 is controlled by the MOS-FET 600 by detecting the current flowing to the resistor R connected in series to the load 200, for instance. In the figure, reference numeral 500 is a battery for supplying power to the half bridge switching regulator 300A according to the present invention and the low voltage switching regulator 300B.

If the load 200 is a magnet clutch of an in-vehicle air conditioner, the electronic device 100 is an in-vehicle electronic control unit for the air conditioner, and if the load 200 is a motor serving as a power source of a power steering, the electronic device 100 is an in-vehicle electronic control unit for the power steering that controls the motor.

The specific configuration of the switching regulator including the soft switch control section described above is not limited to the configurations described in the embodiments, and various changes and modifications may be appropriately made without departing from the scope of the invention. Each mode of correction control performed by the soft switch control section described above may also be appropriately combined without departing from the scope of the invention.

What is claimed is:

1. A half bridge switching regulator comprising:
an output voltage adjusting switch element for adjusting an output voltage;
a synchronous switch element, connected in series with the output voltage adjusting switch element, that is complementary ON operated when the output voltage adjusting switch element is turned OFF;
a voltage detecting section for detecting the voltage at a connecting node of the switch elements in time of turn-OFF of the synchronous switch element; and
a soft switch control section for adjusting the timing of turn-OFF of the synchronous switch element based on the voltage fluctuation detected by the voltage detecting section.

2. The half bridge switching regulator according to claim 1, wherein the soft switch control section extension corrects ON time of the synchronous switch element when judged that current is flowing to the output side and reduction corrects the ON time of the synchronous switch element when judged that current is flowing to the input side in time of turn-OFF of the synchronous switch element based on the voltage fluctuation detected by the voltage detecting section.

3. The half bridge switching regulator according to claim 2, wherein the soft switch control section extension corrects or reduction corrects the ON time of the synchronous switch element by a certain length of time, set in advance.

4. The half bridge switching regulator according to claim 2, wherein the soft switch control section differs the extending correction amount or the reducing correction amount of the ON time of the synchronous switch element based on past voltage fluctuation history detected by the voltage detecting section.

5. The half bridge switching regulator according to claim 2, wherein an initial value of the ON time of the synchronous switch element is set based on an inductance value of a step-up coil or a step-down coil connected to a connecting node of the switch elements.

6. The half bridge switching regulator according to claim 2, wherein the soft switch control section extension corrects or reduction corrects the ON time of the synchronous switch element based on the voltage fluctuation history detected by the voltage detecting section in advance and correction amount map data in which the extending correction amount or the reducing correction amount of the ON time of the synchronous switch element is set.

7. The half bridge switching regulator according to claim 6, wherein the correction amount map data is set based on an inductance value of a step-up coil or a step-down coil connected to a connecting node of the switch elements.

8. A half bridge switching regulator comprising:
an output voltage adjusting switch element for adjusting an output voltage;
a synchronous switch element, connected in series with the output voltage adjusting switch element, that is complementary ON operated when the output voltage adjusting switch element is turned OFF;
a voltage detecting section for detecting the voltage at a connecting node of the switch elements in time of turn-OFF of the synchronous switch element; and
a soft switch control section for adjusting the timing of turn-OFF of the synchronous switch element based on the voltage fluctuation detected by the voltage detecting section; wherein
the voltage detecting section is configured by a comparison circuit for detecting the fluctuation in voltage at both ends of the synchronous switch element, and a mask circuit for retrieving the output from the comparison circuit in time of turn-OFF of the synchronous switch element.

9. The half bridge switching regulator according to claim 8, wherein the comparison circuit compares an input voltage from an input side terminal of the synchronous switch element via a coupling capacitor, and an input voltage from a constant voltage source configured by a diode having one end grounded and generating a predetermined reference voltage and a constant current source connected in series with the diode.

10. The half bridge switching regulator according to claim 8, wherein the soft switch control section extension corrects ON time of the synchronous switch element when judged that current is flowing to the output side and reduction corrects the ON time of the synchronous switch element when judged that current is flowing to the input side in time of turn-OFF of the synchronous switch element based on the voltage fluctuation detected by the voltage detecting section.

11. The half bridge switching regulator according to claim 8, wherein the soft switch control section extension corrects or reduction corrects the ON time of the synchronous switch element by a certain length of time, set in advance.

12. The half bridge switching regulator according to claim 8, wherein the soft switch control section differs the extending correction amount or the reducing correction amount of the ON time of the synchronous switch element based on past voltage fluctuation history detected by the voltage detecting section.

13. The half bridge switching regulator according to claim 8, wherein an initial value of the ON time of the synchronous switch element is set based on an inductance value of a step-up coil or a step-down coil connected to the connecting node of the switch elements.

14. The half bridge switching regulator according to claim 8, wherein the soft switch control section extension corrects or reduction corrects the ON time of the synchronous switch element based on the voltage fluctuation history detected by the voltage detecting section in advance and correction amount map data in which the extending correction amount or the reducing correction amount of the ON time of the synchronous switch element is set.

15. The half bridge switching regulator according to claim 14, wherein the correction amount map data is set based on an inductance value of a step-up coil or a step-down coil connected to a connecting node of the switch elements.

16. An electronic device comprising:
the half bridge switching regulator according to claim 1; and
a control section for controlling power supply on a load based on current or voltage flowing to the load of a device that is supplied with power.

17. An electronic device comprising:
the half bridge switching regulator according to claim 8; and
a control section for controlling power supply on a load based on current or voltage flowing to the load of a device that is supplied with power.

* * * * *